UNITED STATES PATENT OFFICE.

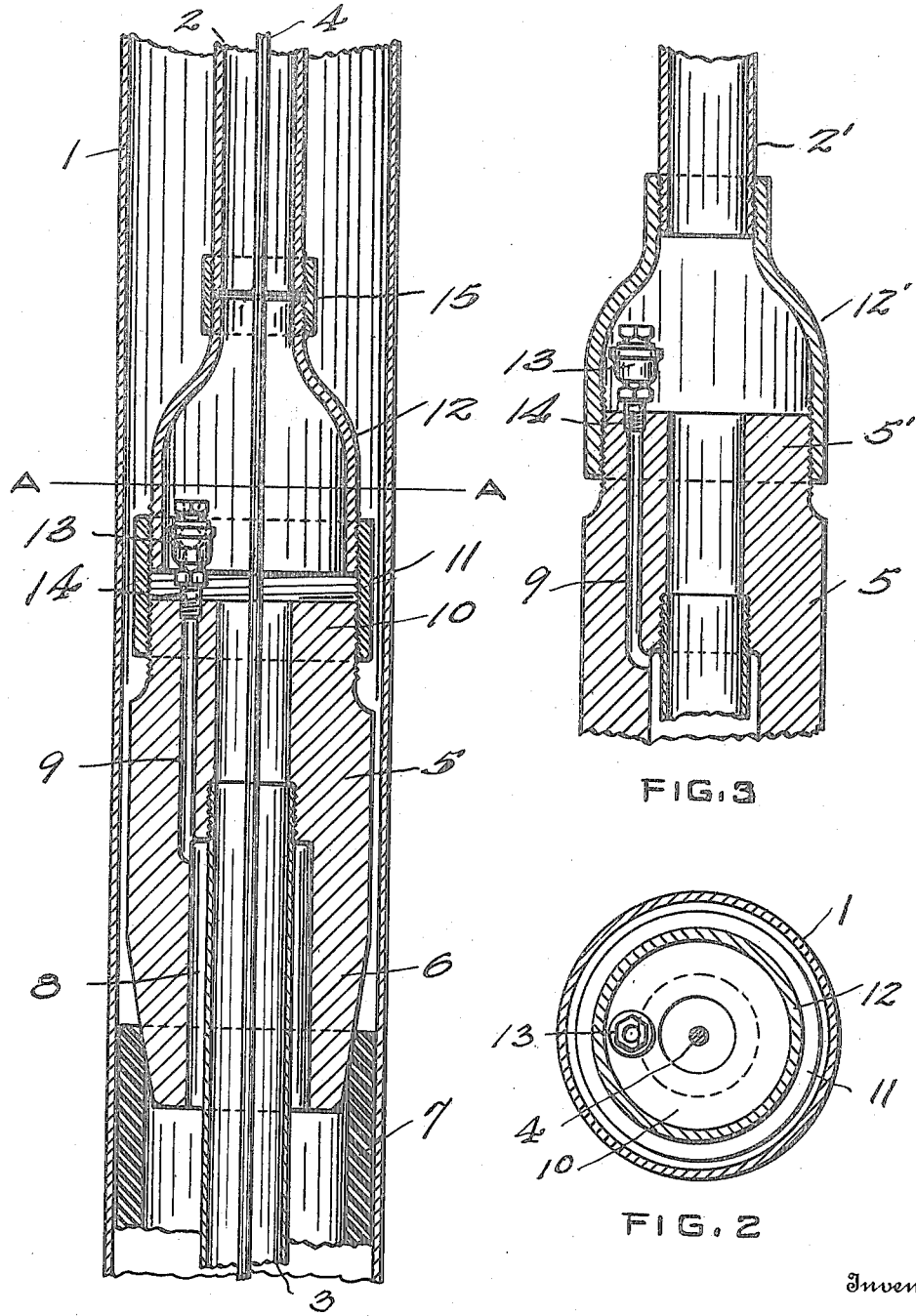

ALBERT J. McNALLEN, OF GORE, OHIO.

PACKER FOR OIL-WELL PUMPS.

1,164,655.

Specification of Letters Patent.  Patented Dec. 21, 1915.

Application filed January 4, 1915. Serial No. 395.

*To all whom it may concern:*

Be it known that I, ALBERT J. McNALLEN, a citizen of the United States of America, residing at Gore, in the county of Hocking and State of Ohio, have invented certain new and useful Improvements in Packers for Oil-Well Pumps, of which the following is a specification.

The present invention relates to improvements in gas escape packers for oil wells, and is designed to provide an efficient packer for this purpose and in connection therewith a novel means for taking care of and disposing of the gas which accumulates beneath the pumping packing in the oil well casing.

The primary object of the invention is to eliminate the use of long and heavy gas pipe lines that are frequently used in oil well casings to convey the gas from the bottom of the oil well to the surface of the ground. There are many objectionable features, on account of expense, labor and repair in connection with this mode of conveying and storing the accumulated gas that are obviated and overcome by the utilization of my improved packer and connections.

The invention consists in certain novel combinations and arrangements of the packing head for the pump with the oil tubing as will be clearly set forth and claimed hereinafter.

In the accompanying drawings I have illustrated one complete example, and a modification, of the best mode I have so far devised for the practical application of the principles of my invention and constructed in accordance therewith.

Figure 1 is a vertical sectional view of a portion of an oil well casing, its tubing, and pump packing head as is necessary to illustrate the applicability of my invention thereto. Fig. 2 is a transverse sectional view on line A—A of Fig. 1. Fig. 3 is a sectional detail view showing a slight modification of the construction of Fig. 1.

In the preferred embodiment of the invention I have illustrated the customary metallic tubular casing 1 for oil wells in which are the two sections 2 and 3 of the oil tube or oil pipe by means of which the oil is conveyed to the surface of the ground from the pumping apparatus not illustrated, but actuated from the cable 4, as usual.

The packing head 5 is of usual form having the lower end 6 tapered to wedge into the rubber or leather packing ring 7 in order to provide both an oil and a gas tight joint between the head and ring and the ring and casing. A gas chamber 8 is formed in the lower end of the packing head, opening at its lower end into the packing ring of the casing, and at its upper end provided with a duct 9 which opens at the top of the packing head. The lower tube section 3 is threaded into the packing head as shown and conveys oil therethrough as shown.

The upper threaded end 10 of the packing head is preferably reduced in diameter and is designed to receive the threaded coupling sleeve 11 to which is threaded the bell shaped nipple 12 forming a dome shaped space or chamber in which the check valve 13 and outlet pipe 14 from the duct or by-pass 9 are situated. The upper and smaller end of the nipple 12 is connected to the lower end of the tube section 2 by means of a coupling bushing 15 properly threaded for the connection.

In Fig. 3 the coupling sleeve and coupling bushing are dispensed with and the nipple 12' is internally threaded at its respective ends in order to receive the threaded ends of the packing head 5' and the tube section 2'. The construction of the device of this figure is otherwise the same as that of Fig. 1. The modified form of the invention in Fig. 3, however, is preferable in some instances.

The operation of the device will be apparent and it will be understood that the pump forces the oil up through the oil tubes to the surface of the ground, while the gas which accumulates in the casing outside the tubing below the packing head, passes through chamber 8, the by-pass and through the check valve into the nipple and thence to the oil tubing 2. The gas is conveyed through the oil tube to the proper receptacle or tank for the purpose, and the check valve prevents return of the gas or downward movement of the oil, as will be understood.

What I claim is:—

1. The combination with an oil well casing and its oil tubing of a packing head forming a portion of the oil tubing and having a chamber surrounding the upper end of the low portion of the tubing, and a by-pass establishing communication through the packing head from the chamber to the interior of the tubing above the head.

2. The combination with an oil well casing of a chambered packing head with a reduced bore, a section of tubing passed through the chamber and fixed in the head continuous with its bore, said head provided with a by-pass from the chamber through the head, a nipple connecting the packing head with an upper section of tubing, and an outlet pipe from said by-pass having a check valve within the nipple.

In testimony whereof I affix my signature in presence of two witnesses.

ALBERT J. McNALLEN

Witnesses:
 H. E. ALBERT,
 ROBERT DAVEY.